2,813,081

HYDROFORMING CATALYST CONSISTING OF GAMMA ALUMINA OXIDE DERIVED FROM BOEHMITE AND MOLYBDENUM BLUE

James A. Dinwiddie and Max A. Mosesman, Baytown, Tex., assignors, by mesne assignments, to Esso Research and Engineering Company, Elizabeth, N. J., a corporation of Delaware No Drawing. Application March 6, 1953,
Serial No. 340,890

4 Claims. (Cl. 252—465)

This application is directed to a catalyst particularly adapted for catalyzing hydrocarbon conversion reactions.

The catalyst of the present application may be described briefly as a supported catalyst with gamma alumina derived from boehmite as the supporting medium and having molybdenum blue adsorbed or precipitated thereon. The catalyst consisting of molybdenum blue adsorbed or precipitated on the gamma aluminum oxide derived from boehmite, before being used, is dried and activated by contact at high temperatures with a non-oxidizing gas and the activated catalyst may then be employed in the process of hydrocarbon conversion.

The gamma alumina used as a base in forming the catalyst of the present invention is derived from boehmite. This material is characterized in having a high surface area and thermal stability.

One method for forming a gamma alumina suitable for use as a base in the present invention is by the hydrolysis of aluminum alcoholate by exposing the alcoholate to a moisture laden atmosphere. The moisture contacts the aluminum alcoholate only in quantities sufficient to hydrolyze the aluminum alcoholate to boehmite rather than to bayerite. The boehmite is then dried, as at a temperature of about 230° F. and the boehmite then dehydrated to gamma alumina by heating to a temperature in the range of 600° to 1600° F.

Another method for obtaining a suitable base for the catalyst composition of the present invention is by hydrolyzing aluminum alcoholate by contacting the alcoholate with water at a temperature above the boiling point of the water or by the use of steam. Preferably, the hydrolysis is conducted at temperatures in the range of 212° to 300° F. for a time within the range of 15 to 30 minutes. This treatment converts the aluminum alcoholate to boehmite which is then preferably dried at a temperature of about 230° F., and subsequently the boehmite is dehydrated to gamma alumina by heating to a temperature in the range of 600° to 1600° F.

Detailed directions for obtaining gamma alumina from boehmite by hydrolyzing aluminum alcoholate with boiling water with subsequent dehydrating of the boehmite to gamma alumina are found in our copending application Serial No. 318,212, entitled "Production of Gamma Alumina," filed November 1, 1952, now U. S. Patent 2,749,216. Detailed instructions for forming gamma alumina from boehmite by contacting aluminum alcoholate with water vapors to hydrolyze the alocholate to boehmite and subsequently dehydrating the boehmite to gamma alumina are found in our copending application Serial No. 318,213, entitled "Preparation of Improved Alumina," filed November 1, 1952.

Molybdenum blue is well known to the art and may be briefly described as a complex oxide of molybdenum which may be formed by controlled reduction of a solution containing hexavalent molybdenum. A generally accepted formula is $Mo_3O_8$. A more detailed description of molybdenum blue may be found, for example, in "The Chemical Elements and Their Compounds," N. V. Sidgwick, vol. II, Oxford, 1950, page 1046.

It is well known to the art that molybdenum blue will undergo oxidation if exposed to oxidizing conditions. For example, if the molybdenum blue is exposed to atmospheric oxygen at a temperature as great as that of boiling water for an appreciable period of time, considerable oxidation may take place in which case a molybdenum oxide will be present, but this molybdenum oxide will not be molybdenum blue. Thus, in adsorbing or precipitating the molybdenum blue on the gamma aluminum oxide derived from boehmite when forming the catalyst of the present application, the conditions should be maintained so that the product is molybdenum blue adsorbed or precipitated on gamma aluminum oxide derived from boehmite rather than some other molybdenum oxide.

It is desirable that the catalyst of the present invention contain molybdenum blue within the range of 4 to 20% by weight based on the dry total catalyst. A preferred composition contains within the range of 9 to 15% molybdenum blue based on the dry total catalyst.

In forming the catalyst composition of the present application, the gamma alumina may be formed from the boehmite and the molybdenum blue then adsorbed or deposited thereon. Another procedure which may be used is to absorb molybdenum blue upon boehmite as the support and then dry and dehydrate the boehmite to gamma alumina with the molybdenum blue being present during the drying and dehydrating steps. Another procedure which may be employed is to incorporate the active constituent, that is molybdenum blue or reactants which form molybdenum blue, in an aluminum alcoholate preparation after which the solution is subjected to the steps of hydrolysis to form boehmite, washing to remove unreacted starting materials, then drying and dehydrating the boehmite containing the active constituent to form gamma alumina.

A method which has been found satisfactory for preparing the catalyst of the present invention is as follows: Gamma alumina formed by the dehydration of boehmite is used as the base. Molybdenum blue is deposited or adsorbed on said gamma alumina by obtaining initially a satisfactory precipitate of molybdenum blue, forming a hot aqueous solution thereof and incorporating hot gamma alumina in said hot aqueous solution of molybdenum blue, the gamma alumina and molybdenum blue solution remaining in contact under non-oxidizing conditions to allow the adsorption of molybdenum blue on said gamma alumina. In order to obtain a uniform adsorption of molybdenum blue on the base, it is desirable to stir the slurry continually during the adsorption step. A desirable contacting time for the molybdenum blue and said gamma alumina is three hours, but a lesser period of time may be used if desired. After the contacting step, said gamma alumina with molybdenum blue adsorbed thereon is separated from the balance of the solution and dried. In this step also it is preferred to avoid oxidation as much as possible which may be done by carrying out the step quickly to reduce contact with oxygen in the atmosphere. The resultant dried catalyst may then be stored as long as convenient. Prior to use, the dried catalyst is activated by heating in an atmosphere with a non-oxidizing gas.

If the gamma alumina derived from boehmite, which is employed for forming the slurry is in the form of a powder, it may be desirable to pill the composition after it has been dried. The pilled catalyst is preferred for use when the catalyst is to be used in the form of a bed, but if the catalyst is to be used in a fluidized condition, it should be maintained finely divided. Whether the dried catalyst is pilled or whether it is maintained in a finely divided or powdered state, it is activated before being used. The activation step involves heating the catalyst in an atmosphere of inert gas at a temperature in the range of 900° to 1400° F. If the catalyst is used in a reaction where hydrogen is present, it will usually be desirable to activate the dry catalyst by heating it first in an atmosphere of nitrogen or flue gas at a temperature in the range of 900° to 1400° F. and thereafter contacting it with hydrogen in the same temperature range, the total contact time of the dried catalyst with inert gases prior to use as a catalyst being at least one hour.

An example of a specific procedure for preparing a catalyst in accordance with the present application is as follows:

EXAMPLE

Aluminum alcoholate was prepared by dissolving aluminum metal turnings in mixed $C_5$ saturated alcohols. The resultant aluminum alcoholate was subjected to atmospheric hydrolysis over a period of about 104 hours and the product then dried at 230° F. to form boehmite. The boehmite was converted to gamma alumina by heating in air at a temperature of 1000° F. for six hours. To 408 grams of this gamma aluminum oxide there was added 229 grams of wet molybdenum blue (70.4% water content) and 750 ml. of distilled water. The wet mixture was then mulled in a jar mill for eleven hours during which 50 ml. of additional water was added. The mixture was then dried for 24 hours at 230° F. and formed into 3/16 inch pills to yield a finished catalyst.

It will be understood that the finished catalyst, made as directed in the preceding example, should be activated by heating it at a temperature in the range of 900° to 1400° F. prior to use.

Examples of methods for preparing solutions of molybdenum blue suitable for use in preparing the catalyst of the present invention are as follows: The molybdenum blue, $Mo_3O_8$, may be dissolved in water or in an aliphatic alcohol which may range from methyl through amyl alcohols. If desired, mixtures of alcohols may be used to dissolve the molybdenum blue, or a combined aqueous and alcoholic solution may be used if desired. Another method for forming the solution is by forming an acidified solution of hexavalent molybdenum and adding thereto a stoichiometric quantity of a suitable reducing agent, such as $SO_2$, amalgamated zinc or amalgamated aluminum. This results in a solution of molybdenum blue.

Any of the solutions of molybdenum blue mentioned in the preceding paragraph may be used for adsorbing or precipitating molybdenum blue on the gamma aluminum oxide base derived from boehmite or may be used when other methods of forming the catalyst are employed such as by mixing the solution of molybdenum blue with the aluminum alcoholate preparation, converting the alcoholate to boehmite with the active constituent precipitated thereon and then converting the boehmite to gamma alumina.

The solutions of molybdenum blue, when containing water, should contain only a concentration of water which will result in the formation of boehmite. Thus, solutions which will result in excessive amounts of water being present during hydrolysis of aluminum alcoholate should be avoided, and an amount of water should be present from the solution, which will result in controlled hydrolysis to the hydrate, boehmite.

Among the hydrocarbon conversions which may be carried out by contact with the catalyst of the present invention are the so-called "hydroforming" process and the "aromatization" process, which is also known as "dehydrocyclization." Both of these processes may be carried out by passing a suitable hydrocarbon feed in vapor phase through a reaction zone containing the catalyst of the present invention. Conditions useful in carrying out the reaction are tabulated hereafter in Table I:

Table I

| Process, Range of conditions | Hydroforming | | Aromatization | |
|---|---|---|---|---|
| | Useful | Preferred | Useful | Preferred |
| Temperature, °F | 800–1,150 | 900–1,000 | 800–1,100 | |
| Pressure, p. s. i. g | 50–500 | 75–250 | 0–100 | 0–50 |
| Liquid space velocity, v./v./hr | .2–5 | 1–4 | .5–3 | |
| Hydrogen rate, cu. ft. (s. c. f.)/bbl | 50–5,000 | 1,000–2,500 | 500–4,500 | 1,000–2,000 |

The feed stocks suitable for hydroforming are characterized by a high proportion of naphthenic components. Aromatization is preferably carried out employing substantially paraffinic naphthas. Suitable feed stocks may boil in the range from about 140° F. to 400° F. or higher.

The hydroforming and aromatization processes are well known to the art and need not be described here in further detail. The processes may be carried out in reactors with fixed catalyst beds, or employing the well known "fluidized" catalyst or the "moving catalyst bed" techniques.

It is understood that, although the reactions are referred to as hydrocarbon conversion reactions, the feed stocks may contain contaminating amounts of non-hydrocarbons. For example, sulfur compounds are often contained in hydroforming feed stocks, and such feeds are, in fact, partially desulfurized during the reaction.

It will also be understood that carbon, deposited on the catalyst during the hydrocarbon conversion reaction, may be removed from the catalyst by conventional regeneration processes, such as controlled combustion by contact with gas of controlled low oxygen content, at temperatures not in excess of about 1050° F.

While specific examples for the preparation of the catalyst of the present application and specific examples for using the catalyst in the conversion of hydrocarbons have been given, it is to be understood that these examples are given by way of illustration only and not as limiting the invention.

Having fully described and illustrated the present invention, what it is desired to claim is:

1. A method for forming a supported catalyst which consists of the steps of forming a mixture of a solution of molybdenum blue and an alcoholic solution of aluminum alcoholate, contacting said mixture with water vapor to hydrolyze said alcoholate to boehmite and to form a second mixture of molybdenum blue and boehmite and then heating the second mixture to a temperature within the range of 600° to 1600° F. to convert said boehmite to heat stable gamma alumina, whereby a supported catalyst of molybdenum blue on heat stable gamma alumina is formed, said solutions being employed in sufficient amounts such that said supported catalyst consists of molybdenum blue in an amount within the range of 4% to 20% by weight of the supported catalyst.

2. A method in accordance with claim 1 in which the steps of forming, contacting, and heating are conducted under non-oxidizing conditions.

3. A method in accordance with claim 1 in which the solution of molybdenum blue is an alcoholic solution of molybdenum blue in an aliphatic alcohol ranging from methyl alcohol through the amyl alcohols.

4. A method in accordance with claim 1 in which said solutions are employed in sufficient amounts such that the supported catalyst consists of molybdenum blue in an amount within the range of 9% to 15% by weight of the supported catalyst.

References Cited in the file of this patent

UNITED STATES PATENTS

| | | |
|---|---|---|
| 2,422,372 | Smith et al. | June 17, 1947 |
| 2,423,163 | Thomas | July 1, 1947 |
| 2,565,428 | Hetzner et al. | Aug. 21, 1951 |
| 2,582,254 | Hunter | Jan. 15, 1952 |
| 2,636,865 | Kimberlin | Apr. 28, 1953 |
| 2,692,259 | Peters | Oct. 19, 1954 |